Nov. 7, 1972          A. G. SELLERS          3,702,197
                      TRAILER HITCH
Filed Nov. 24, 1970                          2 Sheets-Sheet 1
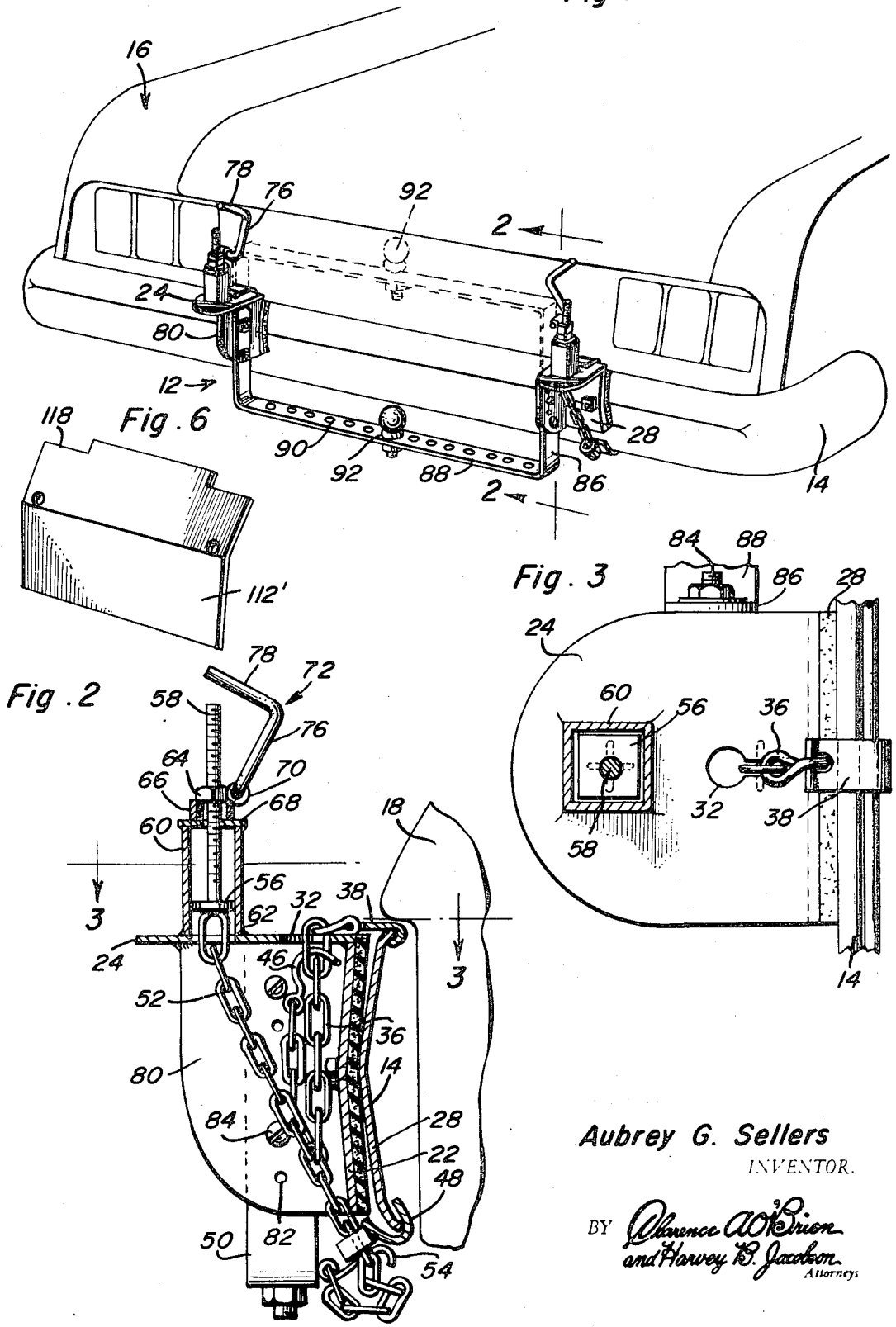
Aubrey G. Sellers
INVENTOR.
BY Clarence A. O'Brien
and Harvey B. Jacobson
Attorneys

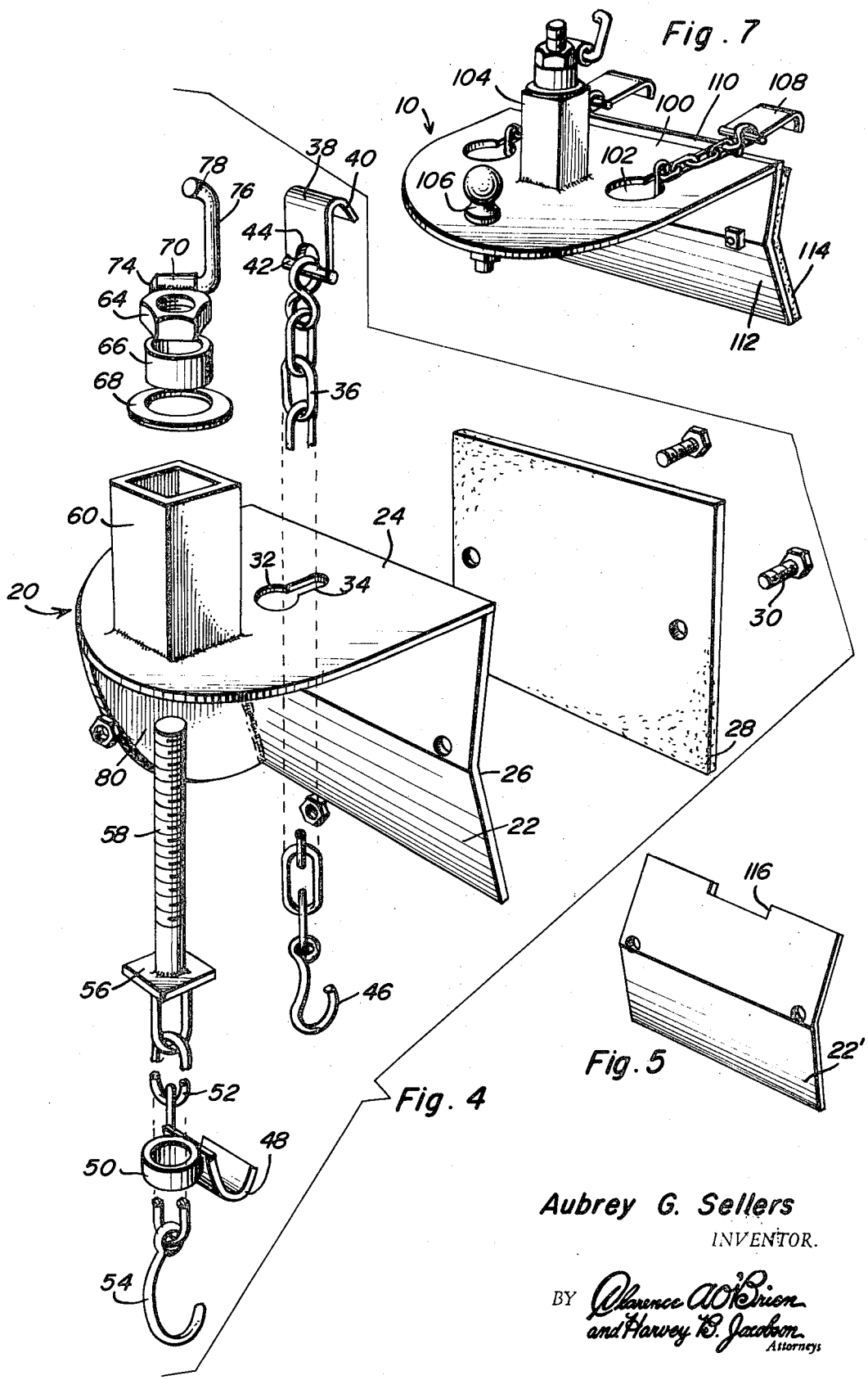

United States Patent Office 3,702,197
Patented Nov. 7, 1972

---

3,702,197
TRAILER HITCH
Aubrey G. Sellers, Kent, Ala., assignor to G. E. Causey, Eclectic, and Jessee W. Pienezza, Tallassee, Ala., fractional part interest to each
Filed Nov. 24, 1970, Ser. No. 92,460
Int. Cl. B60d 1/14, 7/00
U.S. Cl. 280—502      10 Claims

ABSTRACT OF THE DISCLOSURE

A trailer hitch attachable to the rear bumper of an automobile in the form of a generally L-shaped member having upper adjustable hook means engaging the upper edge of the bumper and a lower adjustable hook means engaging the lower edge of the bumper and being manually adjustable by a screw threaded assembly to enable quick, safe and rigid assembly of the trailer hitch with the bumper. The trailer hitch includes a single unit in which the hitch ball is mounted at the rear of the L-shaped member or a dual unit in which an adjustable interconnecting bar extends between two of the L-shaped members with the hitch ball mounted thereon.

BACKGROUND OF THE INVENTION

Field of the invention

The present invention generally relates to a trailer hitch mounted on the rear bumper of automotive vehicles of various types and configurations with the hitch incorporating a novel attaching means which enables the hitch to be quickly and easily assembled and disassembled in relation to the bumper and will provide a rigid and safe connection with the bumper and may be employed as a single unit having the hitch ball mounted thereon or a dual unit interconnected by a horizontally disposed and vertically adjustable bar having the hitch ball mounted thereon.

Description of the prior art

The use of trailer hitches on automotive vehicles such as passenger cars, pickup trucks and the like has become quite widely adapted for towing various trailers such as mobile homes, boat trailers, utility trailers and the like. One of the present problems with trailer hitches is the provision of a secure attachment to the rear bumper of the vehicle and yet enable the hitch to be quickly assembled or disassembled. While various types of hitches have been provided for attachment to the rear portion of a vehicle including rear bumpers, many problems have arisen with existing structures relating to insecure attachment, the necessity of wrenches or other tools for securing the hitch in place or removing it and the time necessary to effect the attachment or detachment of the hitch.

SUMMARY OF THE INVENTION

An object of the present invention is to provide a trailer hitch attachable to the rear bumper of a vehicle which can be quickly attached to or detached from the bumper without requiring the use of any tools whatsoever in a quick and rapid manner with the attachment being secure, rigid and safe.

Another object of the invention is to provide a trailer hitch incorporating adjustable hook assemblies engaging both the upper and lower edge of the bumper together with a vertical angulated plate having a cushioning material on the inner surface thereof for abutting engagement with the front surface of the bumper thereby enabling the hitch to be effectively attached to bumpers of various vertical dimensions and various profile configurations.

A further object of the present invention is to provide a trailer hitch in accordance with the preceding objects in which the hitch includes a substantially L-shaped plate and the lower adjustable hook assembly includes a chain having a threaded member attached to one end thereof and extending through a sleeve in a non-rotative and slidable manner together with a nut engaging the threaded member and provided with a handle to enable rotation thereof to quickly and easily attach and detach the hitch in relation to the bumper.

Still another object of the invention is to provide a trailer hitch in which the hitch is a single unit having the hitch ball mounted on a horizontal component thereof or the hitch may be utilized in a dual arrangement in which the hitch ball is mounted on an adjustable connecting bar which may be oriented in various vertical positions to position the hitch ball in a desired location and enable access to the gasoline filler cap which in some cases is located centrally of the rear of the vehicle.

Another important feature of the present invention is to provide a trailer hitch in accordance with the preceding objects which is ruggedly constructed but still relatively simple in construction and relatively inexpensive in that it employs conventional components

BRIEF DESCRIPTION OF THE DRAWINGS

FIG. 1 is a rear perspective view of the trailer hitch employed in a dual arrangement on the rear of a vehicle.

FIG. 2 is a vertical sectional view taken substantially upon a plane passing along section line 2—2 of FIG. 1 illustrating further structural details of the hitch.

FIG. 3 is a plan, sectional view taken substantially upon a plane passing along section line 3—3 of FIG. 2 illustrating further structural details of the hitch.

FIG. 4 is an exploded group perspective view of the components of the hitch.

FIG. 5 is a perspective view of a modified form of abutment plate to receive the upper hook in certain attachments.

FIG. 6 is a perspective view of another modified form of abutment plate.

FIG. 7 is a perspective view of a single trailer hitch.

DESCRIPTION OF THE PREFERRED EMBODIMENT

Referring specifically to the drawings, the single form of the trailer hitch is designated by numeral 10 and in FIG. 1, the dual form of the trailer hitch is designated by the numeral 12. In each instance, the trailer hitch is attached to the rear bumper 14 of an automotive vehicle 16. The hitch may be constructed to bumpers having various vertical dimensions and various transverse profiles and is universally attached to bumpers associated with adjacent portions of the vehicle body such as the rear portion 18 of the vehicle 16 as illustrated in FIG. 2.

Referring now specifically to FIGS. 1–4, the trailer hitch 12 includes a substantially L-shaped attaching member 20 which includes a substantially vertically disposed abutment plate 22 and a substantially horizontally disposed plate 24 rigidly affixed to each other and having a substantial horizontal dimension lengthwise of the bumper 14 and a substantial vertical dimension. The vertical central portion of the abutment plate 22 is provided with a valley or recess 26 which extends from end to end thereof and which is formed by providing the abutment plate 22 with two angularly disposed portions to generally conform with and engage the outer convex surface of the bumper 14. The upper end of the abutment plate 22 may be integral with the plate 24 and are welded thereto along the top edge or any point spaced below the top edge of the abutment plate 22.

Disposed against the inner surface of the abutment plate 22 is a resilient pad or cushion 28 which may conveniently be of rubber, plastic or other similar material which will conform in shape and configuration to the inner surface of the abutment plate 22 and be secured thereto in any suitable manner such as by the use of fastening devices, bolts or the like 30 in which the heads are recessed inwardly of the exposed surface of the head 28 to eliminate scratching or marring the outer surface of the bumper 14. The pad 28 may be bonded to the abutment 22 with suitable adhesive material or otherwise secured to the abutment plate 22 in any suitable manner to conform in shape and configuration to the abutment plate and have the same concavity facing the bumper 18 for engaging with the convex surface of surfaces of the bumper 14.

The plate 24 has a circular aperture 32 centrally disposed therein and a parallel sided notch 34 communicating with the edge thereof and extending toward the forward edge of the plate 24 as illuustrated in FIG. 4 thus forming a keyhole shaped opening through the central portion of the plate 24. The opening 32 is of sufficient diameter to enable a link chain 36 to be moved vertically therethrough while the slot 34 is of such a dimension to receive a single link of the chain 36 when it is moved laterally into the slot thus locking the chain 36 from longitudinal movement in relation to the plate 24. The upper end of the chain 36 is provided with a hook-type clamp 38 generally in the form of a plate having a reversely curved and downwardly extending terminal end 40 for engaging over the top edge of the bumper 14 as illustrated in FIG. 2. The end of the clamp or hook 38 engaged by the chain 36 is provided with a transverse rod 42 welded thereto which extends through the endmost link of the chain 36. A notch 44 is provided in the hook plate 38 centrally of the rod 42 to enable relative free swinging movement between the chain link and the hook clamp 38 so that the hook clamp may be engaged with the edge of the bumper either generally in a horizontal manner as illustrated in FIG. 2 or in a vertical manner or any inclined position between horizontal and vertical thus enabling the upper hook to engage various types of bumpers and to be adjusted in relation to the plate 24 thereby enabling the position of the plate 24 and thus the abutment plate 22 to be vertically adjusted in relation to the top edge of the bumper so that the horizontal plate 24 may be positioned in the desired orientation in relation to the bumper.

The lower end of the chain 36 is provided with a hook 46 which can be inserted through the link of the chain 36 received in the slot 34 or in the link immediately below the slot 34 to assure positive locking engagement between the chain 36 and the plate 24. FIG. 2 illustrates the manner in which the hook 46 is inserted into the link which is engaged in the slot 34 with it being pointed out that in some instances, the hook 46 would be engaged with the link next below that one engaged in the notch 34 such as if the hook 38 was extending vertically or in a vertical direction, the hook 46 would be locked into the link received in the notch 34 by being in engagement with the undersurface of plate 24.

A lower clamp hook 48 engages the bottom edge of the bumper 14 as illustrated in FIG. 2 and includes a tubular sleeve 50 rigidly fixed to the hook with the axis of the sleeve 50 being disposed generally perpendicular to the edges of the clamp hook 48. The sleeve 50 is of a diameter to closely but movably receive a chain 52 adjustably therethrough. The lower terminal end of the chain 52 is provided with a hook 54 which is insertable through a chain link immediately below the sleeve 50 thus locking the chain 52 in one direction thus, effectively adjusting the length of the chain 52. The position of the hook 54 in the chain link and in relation to the sleeve 50 is illustrated in FIG. 2 and it will be apparent that tension on the chain 52 will exert clamping pressure on the hook 48 thereby securing the hitch to the bumper.

For exerting tension on the chain 52, the upper end of the chain 52 is rigidly secured to the polygonal head 56 of an externally threaded rod or bolt 58. The head 56 is of square configuration and is dimensioned to fit slidably within a vertically disposed sleeve or guide 60 rigidly affixed to the plate 24 with the plate 24 having an opening 62 therein in alignment with the interior of the sleeve 60 so that the chain 52 can pass therethrough. As illustrated in FIG. 2, the head 56 is slidable but non-rotatable in the sleeve or guide 60 with the uppermost link of the chain 52 being welded to the undersurface thereof. Thus, when the threaded rod or bolt 58 is moved upwardly in the sleeve 60, the chain 52 will be tensioned or rightened and when the threaded rod or bolt 58 is moved downwardly, the chain 52 will be loosened or slackened.

Threadedly mounted on the threaded rod or bolt 58 is a nut 64 and disposed below the nut 64 is a tubular spacer 66 and a washer or plate 68 which has an external perimeter at least as large as the sleeve 60 so that it will engage the upper end of the sleeve and form an abutment for engagement by the spacer 66 and the nut 64 so that when the nut 64 is rotated to move it downwardly on the bolt 58, the bolt will correspondingly be moved longitudinally upwardly in relation to the sleeve 60 and correspondingly, when the bolt 64 is rotated to move upwardly in relation to the bolt 58, the bolt 58 may then move downwardly in relation to the sleeve 60.

One side of the nut 64 is provided with a tangential sleeve 70 rigidly affixed thereto as by welding or the like with the axis of the sleeve 70 being substantially perpendicular to the vertical axis of the internal threaded portion of the nut 64. Mounted in the sleeve 70 is an angulated handle generally designated by the numeral 72 having an angulated inner end portion 74 rotatably received within the sleeve 70 and secured therein in any suitable manner. The inner end of the handle 72 is provided with a laterally extending offset portion 76 which when being used is disposed substantially horizontal in perpendicular relation to the inner portion 74 and in perpendicular relation to the bolt 58. The outer end of the horizontal portion is provided with a vertically extending portion 78 which serves as a handle to rotate the nut with the portion 78 normally being disposed parallel to the bolt 58 when being used.

The inner edge of each of the L-shaped members 60 is provided with a vertically depending plate 80 welded to or otherwise secured to the inner edge of the horizontal plate 24 and the abutment plate 22 with the plate 80 having a plurality of vertically spaced and aligned apertures 82 therein for receiving removable fasteners 84 which secure the laterally extending legs 86 of a transversely extending support bar 88 to the L-shaped members 20. The bar 88 is provided with a plurality of longitudinally spaced apertures 90 therein which adjustably receive a hitch ball 92 so that the hitch ball may be adjusted longitudinally of the bar 88 or laterally of the vehicle. Further, the hitch ball 92 may be vertically adjusted by assembling the bolts 84 with selected apertures 82. Also, the support bar 84 may be inverted with the hitch ball 92 also being placed so that it projects upwardly to the dotted line position illustrated in FIG. 1 in which event the legs 84 would depend and still be vertically adjustable in relation to the L-shaped members 20. This enables the hitch ball 92 to be vertically adjusted through a wide range of vertical adjustment and also enables the hitch ball to be positioned in an area which still will enable access to the rear gasoline filler cap and also enable observation of the rear license plates and adapt the hitch for use with various types of vehicles.

FIG. 7 illustrates a single unit 10 in which the horizontal plate 100 includes two keyhole shaped apertures 102. The plate 100 is substantially the same as the plate 24 except for the two keyhole shaped apertures 102 which are symmetrically spaced from the centerline of the plate 100. Also, in this construction, the sleeve 104 which corresponds with the sleeve 60 is more or less centrally disposed on the plate 24 and is at least disposed forwardly of the rear curved edge of the U-shaped plate 100 so that a hitch ball 106 may be mounted directly on the plate 100 adjacent the rear edge thereof so that the trailer may be connected directly to the single hitch 10. In this construction, two upper clamp hooks 108 are employed with each clamp hook 108 being the same as the clamp hook 38. The clamp hooks 108 are interconnected by a continuous chain 110 in which the central portion of the continuous chain 110 is disposed below the plate 100 and the clamp hooks 108 are adjusted in relation to the plate 100 by engaging the links of the chain in the keyhole slot 102. The lower clamp hook, not illustrated in FIG. 7, is exactly the same as the lower clamp hook 48 and its associated chain 52, hook 54, threaded bolt 58 and nut 64 and similar structure as illustrated in FIG. 4 and the same reference numerals are provided therefor. Also, the abutment plate 112 and pad 114 are the same as the corresponding structures 22 and 28 in FIG. 4. Thus, in each instance whether a single unit or dual unit is employed, the hitch assembly is attached to the bumper in the same manner, that is, with upper and lower hook assemblies both of which are adjustable with the lower hook assembly being tightenable by rotating the handle 72.

The snug reception of the head 56 on the bolt 58 within the sleeve or guide 60 assures that lateral forces exerted on the bolt 58 when the chain 52 is tightened will not cause bending of the bolt 58 and subsequent loosening of the chain 52. Thus, when the chain 52 is tightened, it will assume a straight line condition between the hook and sleeve assembly 48 and 50 to the link of the chain welded to the head 56 to assure proper tensioning of the chain which will be retained during over-the-road operation which introduce vibrations and the like into the hitch. Where the overhang of the body of the vehicle such as the overhang 18 in FIG. 2 is such that the upper hook or hooks 38 or 108 cannot extend over the upper edge of the abutment plate when it is disposed above the horizontal plate 24, the upper edge of the abutment plate 22 may be provided with a notch 116 in the center thereof when the dual unit is being used and only a single hook 38 is employed or a pair of notches 118 can be used when the single unit is employed and a pair of hooks 108 are employed. These two embodiments of the abutment plate are illustrated in FIGS. 5 and 6 respectively and are designated by numerals 22' and 112' respectively.

Of course, the cushioning material or pad will also be correspondingly shaped. It is pointed out that the chain link to which the hooks 38 or 108 are connected is in the form of a twisted link in which the end loops are oriented in perpendicular relation to each other which enables the chain to be effectively tightened without buckling or binding during adjustment in relation to the keyhole slot or slots. This eliminates the possibility of the chain being twisted or buckled when tightended and subsequently loosening when becoming unbuckled or untwisted.

The trailer hitch may be attached to any bumper of any make vehicle within a very short time without the use of any tools. In assembling the hitch, the two upper bumper clamps are adjusted to the proper length by moving the adjustment chains into the large portion of the adjustment holes and adjusting to the proper length and then moving the chains back into the slots. The lower clamp adjustment bolt is then loosened as much as possible by using the crank handle and the lower bumper clamp is then moved so that it is the proper length to fit the bumper with the lower adjustment hook then being inserted into the chain and the next link below the lower bumper clamp which retains the lower bumper clamp in its proper position. The lower bumper clamp is then placed on the bottom edge of the bumper and tightened by turning the crank handle until the adjustment bolt draws the lower adjustment chain tight.

The trailer hitch can be stored compactly inside the trunk of an automobile, the cab of a truck or the like which reduces the possibility of theft of the hitch and also protects it during periods of non-use. The hitch can be built to any desired size and strength with the strength of the hitch being dependent upon the size and strength of the component parts with the size and strength of the component materials and the strength of the bumper to which the trailer hitch is attached determining the maximum load to be handled by the hitch. The trailer hitch may have the usually provided safety chains on the trailer or towed vehicle attached thereto by connecting the chains to the large hole or holes forming portions of the keyhole slot or slots. Also, the trailer hitch may be made less subject to theft by locking the handle of the clamp tightening nut. This may be accomplished in several ways either by associating a padlock with the handle or drilling a hole in the bolt immediately above the nut after it has been adjusted to the clamped position and placing a padlock therethrough.

The trailer hitch can be adapted for various uses other than specifically illustrated in the drawings. For example, a trailer hitch may be installed at the end of each of the chassis rails or bumper extensions thereof with an adjustable bar extending between the two trailer hitches somewhat similar to the arrangement illustrated in FIG. 1 with the hitch ball mounted on the adjustable bar. The support bar 88 could be provided with longitudinal slots having a chain attached thereto with the chain extending forwardly and wrapping around the axle housing or the like and retained in a tightened condition so that a portion of the stress borne by the ball hitch will be supported by the rear axle housing as well as the bumper assembly thereby reducing the possibility of the bumper assembly being damaged due to excessive forces being applied thereto. While the disclosure has related to applying the hitch to the towing vehicle, it is also within the purview of this invention to attach the hitch either in its single form or dual form to a towed vehicle. For example, two of the hitches could be attached to the bumper or chassis rail extensions of a towed vehicle and be connected to the ball hitch on the support bar carried by the towing vehicle. By using the triangular type tow bar, the legs of the tow bar can be spread apart or closed together to fit hitches which have been attached to a towed vehicle regardless of their spatial relation. Various types of connection may be provided between the tow bar and the hitches on the towed vehicle. Thus, the hitch assembly of the present invention may be installed in various arrangements and orientations thereby providing a universal type of hitch adapted for use with various types of vehicles either towed or towing with the hitch ball being laterally adjustable for in-line towing or off-set towing which is significant when towing various farm instruments such as haybalers, side delivery rakes and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equiva-

What is claimed as new is as follows:

1. A trailer hitch for mounting on a vehicle bumper comprising a generally vertically disposed abutment plate adapted to be engaged with the outer surface of the bumper, a mounting plate rigidly fixed to said abutment plate, upper hook means adjustable connected to the mounting plate and engaging the top edge of the bumper for positioning the mounting plate and abutment plate in relation to the bumper, and lower hook means adapted to engage the lower edge of the bumper, said lower hook means including an adjustable flexible having a bumper engaging hook means thereon adapted to engage the lower edge of the bumper for effectively varying the length of the flexible member, and means interconnecting the flexible member and mounting plate to tighten the flexible member and tighten the lower hook means into secure engagement with the bumper thus drawing the abutment plate tightly against the outer surface of the bumper, and means connected with said mounting plate for connection with a hitch, said flexible member being in the form of a chain, a hook on the free end of said chain, said lower hook means including a sleeve slidably receiving said chain whereby the chain may be slid through the sleeve and the hook on the free end of the the chain inserted under a link below the sleeve thereby adjusting the hook means on the chain, said sleeve having a bumper engaging hook rigidly connected thereto.

2. The structure as defined in claim 1 wherein said means on said mounting plate includes an aperture therein and a hitch ball supported in said aperture adjacent the outer edge of the mounting plate remote from the abutment plate.

3. The structure as defined in claim 1 wherein said means on the mounting plate includes a vertical plate substantially perpendicular to the mounting plate and abutment plate, and a support bar adjustably attached to the side plate and extending laterally therefrom and adjustably attached to the side plate of a similar hitch disposed in spaced relation along the bumper, and a hitch ball mounted on said support bar for longitudinal movement on the support bar and for vertical adjustment with the support bar in relation to the hitches.

4. The structure as defined in claim 1 wherein said means connecting the flexible member and mounting plate includes a vertically disposed guide sleeve rigidly fixed to said mounting plate, a threaded bolt disposed in said sleeve, means on said bolt and associated with said sleeve to prevent rotation of the bolt in relation to the sleeve while permitting longitudinal movement of the bolt in the sleeve, the lower end of the bolt being connected to said chain, the upper end of the bolt extending above the sleeve on the mounting plate, and a threaded nut on the upper end of said bolt operatively associated with said sleeve on the mounting plate to move the bolt longitudinally and thus tighten the chain when the nut is tightened on the bolt.

5. The structure as defined in claim 4 wherein said nut includes a laterally extending angulated handle thereon to facilitate rotation thereof and a thrust washer between the upper end of the sleeve and the nut to facilitate relative rotation therebetween.

6. The structure as defined in claim 5 wherein said means interconnecting the bolt and sleeve on the mounting plate including a polygonal head on the bolt, said sleeve being correspondingly polygonal in shape and snugly receiving the polygonal head to permit longitudinal movement of the bolt but prevent rotation thereof.

7. The structure as defined in claim 1 wherein said upper hook means includes a single hook member having a chain attached thereto, said mounting plate having a keyhole slot formed therein receiving the chain with the slot portion of the keyhole slot being disposed towards the abutment plate for locking the chain adjustably in relation to the mounting plate thereby adjusting the position of the mounting plate and abutment plate in relation to the top edge of the bumper.

8. The structure as defined in claim 7 wherein the chain having the upper hook thereon is provided with a hook on the lower end thereof, said hook adapted to extend through a chain link below the mounting plate to lock the chain in adjusted position.

9. The structure as defined in claim 1 wherein said upper hook means includes a pair of hooks interconnected by a chain, said mounting plate including two laterally spaced keyhole slots receiving the end portions of the chain in spaced relation to the hooks thereon, the slot portions of the keyhole slots being disposed adjacent the abutment plate for receiving the links of the chain for locking the chain in adjusted position in relation to the mounting plate thereby varying the relationship of the mounting plate and abutment plate to the bumper.

10. A trailer hitch for mounting on a vehicle bumper comprising a generally vertically disposed abutment plate adapted to be engaged with the outer surface of the bumper, a mounting plate rigidly fixed to said abutment plate and projecting outwardly therefrom, upper hook means adjustably connected to the mounting plate and engaging the top edge of the bumper for positioning the mounting plate and abutment plate in relation to the bumper, lower hook means engaging the lower edge of the bumper, said lower hook means including an adjustable flexible member having a bumper engaging hook means thereon adapted to engage the lower edge of the bumper, means interconnecting the flexible member and the mounting plate to tighten the lower hook means into secure engagement with the bumper for drawing the abutment plate tightly against the outer surface of the bumper, and means connected with said mounting plate for connection with a hitch, said means connecting the mounting plate and the flexible member including a vertically disposed guide sleeve rigidly fixed to the mounting plate, a threaded bolt disposed vertically in said sleeve with the lower end of the bolt being connected to the flexible member and the upper end of the bolt extending above the sleeve on the mounting plate, nut means threaded on the upper end of the bolt and operatively associated with the sleeve on the mounting plate to move the bolt longitudinally and thus tighten and loosen the flexible member when the nut means is rotated in relation to the bolt, a polygonal head rigidly connected to the bolt, said sleeve being correspondingly polygonal in shape and snugly receiving the polygonal head on the bolt to prevent rotation of the bolt in relation to the sleeve while permitting longitudinal movement of the bolt in the sleeve, said nut means including a threaded nut, thrust washer means interposed between the threaded nut and the upper end of the polygonal sleeve to exert longitudinal thrust on the bolt when the nut is turned, a laterally extending handle of angulated configuration pivotally mounted on said nut to enable manual rotation thereof with the handle being pivotable to an inoperative position adjacent the nut, upper hook means including a pair of hooks interconnected by a chain, said mounting plate including two laterally spaced keyhole slots receiving the end portion of the chain in spaced relation to the hooks thereon, the slot portion of the keyhole slots being disposed adjacent the abutment plate for receiving the links of the chain for locking the chain in adjusted position in relation to the mounting plate thereby varying the relationship of the mounting plate and the abutment plate to the bumper, said flexible member being in the form of a chain having a hook on the free end thereof and the other end thereof being connected to the head of the bolt, said lower hook means including a sleeve slidably engaging said chain between said free end and said other end to enable adjustment of the lower hook means along the length of the chain, said hook on the free end of the chain having a dimension greater than the diameter of the sleeve on the lower hook means to enable the hook on the chain to be inserted through a chain link below the sleeve on the lower hook means thereby securing the lower hook means adjustably along the length of the chain to facilitate engagement of the lower hook means with the lower edge of the bumper, said sleeve on the lower hook means having a bumper engaging hook rigidly connected thereto.

References Cited

UNITED STATES PATENTS

| | | | |
|---|---|---|---|
| 3,233,917 | 2/1966 | Lindsey et al. | 280—502 |
| 2,772,099 | 11/1956 | Smith | 280—502 |
| 2,840,392 | 6/1958 | Miles et al. | 280—502 X |
| 2,825,522 | 3/1958 | Bolmes et al. | 248—361 |
| 3,011,818 | 12/1961 | Matthiessen | 248—361 X |
| 3,198,552 | 8/1965 | Hopkins | 280—502 |
| 2,637,566 | 5/1953 | Nichols | 280—505 X |
| 3,302,958 | 2/1967 | Fawcett et al. | 280—502 X |
| 3,446,519 | 5/1969 | Garner | 280—502 |
| 3,481,630 | 12/1969 | Parkhurst | 280—502 |

FOREIGN PATENTS

| | | | |
|---|---|---|---|
| 1,550,791 | 11/1968 | France | 280—505 |

BENJAMIN HERSH, Primary Examiner

R. R. SONG, Assistant Examiner